United States Patent Office 2,782,194
Patented Feb. 19, 1957

2,782,194

MERCAPTO DERIVATIVES OF MERCURATED 1-ALKYL-THEOBROMINE

John H. Biel, Milwaukee, Wis., assignor to Lakeside Laboratories, Inc., a corporation of Wisconsin No Drawing. Application March 20, 1956,
Serial No. 572,609

6 Claims. (Cl. 260—242)

This invention relates to novel chemical compounds and processes of preparing the same. More particularly, this invention is concerned with novel sulfur compounds.

According to the present invention there are provided novel thiol derivatives of 1-(gamma-mercuri-beta-hydroxypropyl)-theobromine having the formula

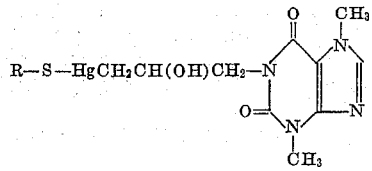

wherein R is a water solubilizing residue as from lower monocarboxylic acids; lower polycarboxylic acids, particularly dicarboxylic acids; aromatic mono and polycarboxylic acids, particularly where the aryl moiety is phenyl; lower polyhydric alcohols; and salts thereof.

Examples of particular groups which R—S— of the above formula may represent are the following from mercaptan acids and polyhydric mercaptans:

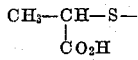      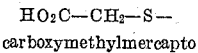

1 carboxyethylmercapto      carboxymethylmercapto

HO₂C—CH₂CH—S—
    |
    CO₂H 1,2-dicarboxyethylmercapto

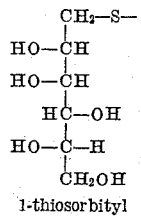

1-thiosorbityl

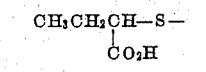      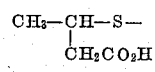

1-carboxypropylmercapto      1-carboxymethyl-ethylmercapto

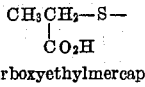      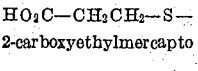

1-carboxyethylmercapto      2-carboxyethylmercapto

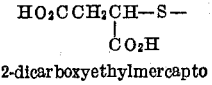      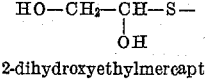

1,2-dicarboxyethylmercapto      1,2-dihydroxyethylmercapto

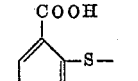      HOCH₂—CH(OH)CH₂—S—

2,3-dihydroxypropylmercapto 2-mercaptobenzoic acid

The compounds of this invention, such as those set forth above, may be conveniently produced by reacting a 1-(gamma-acyloxymercuri-beta-hydroxypropyl)- theobromine, a 1 - (gamma - halomercuri - beta-hydroxypropyl)-theobromine or a 1-(gamma-hydroxymercuri-beta-hydroxypropyl)-theobromine, with the mercaptan acid or polyhydric mercaptan in a suitable solvent medium.

Dilute aqueous sodium hydroxide may be used as the reaction medium for the mercaptan acids. The reaction proceeds quickly at room temperature and is often completed in a matter of minutes. Higher temperatures, such as up to the reflux temperature, may be employed however to enhance reaction of the slowly-reactive mercaptan acids. Following termination of the reaction, the mixture is usually filtered. The basic reaction mixture gives salts of the reaction product. Upon neutralization of the mixture the free acid is formed and precipitates. It is conveniently recovered and purified by conventional procedures.

Although the polyhydric mercaptans may also be reacted in aqueous sodium hydroxide with the mercuri compound, it is often better to employ an organic solvent such as a lower alcohol, benzene or toluene in the absence of the base. From room to reflux temperatures may be employed according to the reactivity of particular reactants. The desired product may precipitate from the reaction mixture and can, therefore, be recovered by filtration; otherwise it may be recovered by evaporating the mixture to dryness or other common procedures.

Approximately equimolar ratios of reactants are preferred although other ratios may also be used.

The acyloxy group of the mercuri reactants may be any suitable group although it is generally most convenient for the group to be a lower acyloxy group, such as the acetoxy group. Of the halomercuri reactants, it is preferred to employ chloromercuri or bromomercuri compounds.

The compounds of this invention form salts. Those compounds having carboxy groups form alkali metal salts, such as sodium and potassium salts, readily upon contacting the acid and base in water. Ammonium salts are similarly prepared by the use of ammonium hydroxide. Salts are also formed with amines such as procaine, choline, bursine and the like.

The novel compounds provided by this invention are potent diuretic agents which are effective by all routes of administration and are, therefore, valuable agents for the treatment of congestive heart failure. It is surprising that these compounds are administrable by all routes as generally such compounds must be administered according to a particular route. These compounds may be given orally and parenterally, the latter either intramuscularly or subcutaneously. Dosage unit forms such as tablets, capsules and solutions may be formulated for the intended route of administration.

The following examples illustrate specific embodiments of the invention. It is to be understood, however, that these examples are not to be construed as limiting the scope of the invention.

EXAMPLE 1

*1-[gamma-(1-carboxyethylmercapto)-mercuri-beta-hydroxypropyl]-theobromine*

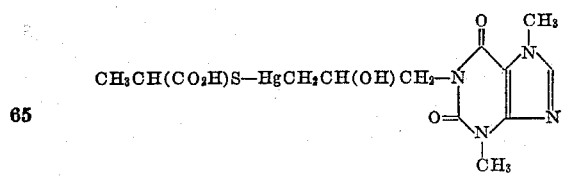

To 13.5 g. of 1-(gamma-acetoxymercuri-beta-hydroxypropyl)-theobromine dissolved in a solution of 30 cc. of water and 21.4 g. of 10% sodium hydroxide was added 2.88 g. of thiolactic acid. The solution was clarified by filtration and neutralized with 1.8 g. of glacial acetic acid in 20 cc. of water. The solution yielded a crystalline precipitate on standing which was separated by filtration. Yield 3.7 g.; M. P. 133–134° C. dec.

*Anal.*—Calcd. for $C_{13}H_{17}HgN_4O_5S$: Hg, 37.0. Found: Hg, 35.6.

EXAMPLE 2

*1-[gamma-(1-carboxymethylmercapto)-mercuri-beta-hydroxypropyl]-theobromine*

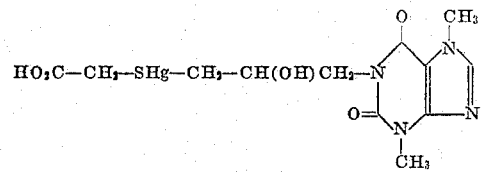

To a suspension of 14.88 g. (0.03 mole) of 1-(gamma-acetoxymercuri-beta-hydroxypropyl)-theobromine in 35 cc. of water was added 2.4 g. (0.06 mole) sodium hydroxide in 18 cc. of water. The resulting solution was clarified by filtration and to the cooled filtrate was added 2.7 g. (0.03 mole) of thioglycolic acid. The mixture was clarified by filtration and 1.8 g. (0.03 mole) of glacial acetic acid added to the filtrate. The resulting precipitate was separated by filtration, cooled with water and acetone. Yield 12 g., M. P. 160–161° C. dec.

*Anal.*—Calcd. for $C_{12}H_{15}HgN_4O_5S$: Hg, 38.00. Found: Hg, 37.80.

EXAMPLE 3

*1-[gamma-(1,2-dicarboxyethylmercapto)-mercuri-beta-hydroxypropyl]-theobromine*

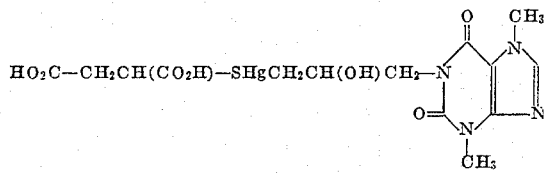

To 13.5 g. (0.027 mole) of 1-(gamma-acetoxymercuri-beta-hydroxypropyl)- theobromine in 30 cc. of water was added 21.4 g. of 10% sodium hydroxide. The mixture was clarified by filtration and the filtrate reacted with 4.1 g. of thiomalic acid (0.027 mole). The solution was clarified by filtration and neutralized with 1.6 g. of glacial acetic acid in 10 cc. of water. The solution was concentrated to dryness and the residue crystallized from 150 cc. of methanol; 7.5 g. of solid was collected by filtration, M. P. 159° C. dec.

*Anal.*—Calcd. for $C_{14}H_{17}HgN_7OS$: Hg, 34.15. Found: Hg, 34.00.

EXAMPLE 4

*1-[gamma-(thiosorbityl)-mercuri-beta-hydroxypropyl]-theobromine*

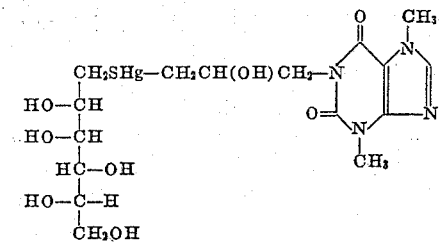

To 4.91 g. (0.01 mole) of 1-(gamma-acetoxymercuri-beta-hydroxypropyl)-theobromine suspended in 100 cc. of methanol was added 1.98 g. (0.01 mole) of thiosorbitol. The mixture was refluxed until a clear solution was obtained. On standing in the refrigerator a solid precipitated which was separated by filtration, 4.0 g., M. P. 103–105° C. dec.

*Anal.*—Calcd. for $C_{16}H_{26}HgN_4O_8S$: Hg, 31.65; S, 5.04. Found: Hg, 31.02; S, 4.55.

Various changes and modifications of the invention can be made and, to the extent that such variations incorporate the spirit of this invention, they are intended to be included within the scope of the appended claims.

What is claimed is:

1. A compound of the formula

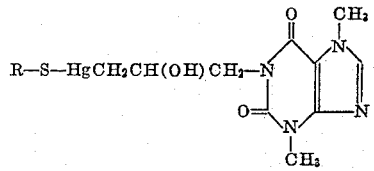

wherein R is a water solubilizing residue of the group consisting of monocarboxy substituted lower alkyl groups, polycarboxy substituted lower alkyl groups, monocarboxy substituted aromatic groups, polycarboxy substituted aromatic groups, lower polyhydric alcohol groups, and salts thereof.

2. 1-[gamma-(1-carboxyethylmercapto)-mercuri-beta-hydroxypropyl]-theobromine.

3. 1 - [gamma - (1 - carboxymethylmercapto)-mercuri-beta-hydroxypropyl]-theobromine.

4. 1 - [gamma - (1,2-dicarboxyethylmercapto)-mercuri-beta-hydroxypropyl]-theobromine.

5. 1 - [bassa - (thiosorbityl) - mercuri-beta-hydroxypropyl]-theobromine.

6. The process which comprises reacting a 1-(gamma-R - mercuri - beta - hydroxypropyl) - theobromine with a member of the group consisting of lower mercaptan monocarboxylic acids, lower mercaptan polycarboxylic acids, aromatic mercaptan monocarboxylic acids, aromatic mercaptan polycarboxylic acids, and lower mercaptan polyhydric alcohols to form a compound of the formula

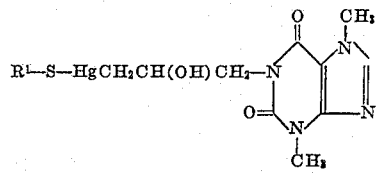

wherein R is a member of the group consisting of halo, hydroxy and acyloxy groups and $R^1$ is a water solubilizing residue of the group consisting of monocarboxy substituted lower alkyl groups, polycarboxy substituted lower alkyl groups, monocarboxy substituted aromatic groups, polycarboxy substituted aromatic groups, lower polyhydric alcohol groups, and salts thereof.

No references cited.